United States Patent
Sun et al.

(10) Patent No.: US 12,457,081 B2
(45) Date of Patent: Oct. 28, 2025

(54) RADIO LINK MANAGEMENT, BEAM FAILURE DETECTION AND DEFAULT BEAM ENHANCEMENTS FOR HIGH SPEED TRAIN DEPLOYMENTS

(71) Applicant: Apple Inc., Cupertino, CA (US)

(72) Inventors: Haitong Sun, Cupertino, CA (US); Chunxuan Ye, San Diego, CA (US); Dawei Zhang, Saratoga, CA (US); Jie Cui, San Jose, CA (US); Manasa Raghavan, Sunnyvale, CA (US); Seyed Ali Akbar Fakoorian, San Diego, CA (US); Sigen Ye, San Diego, CA (US); Wei Zeng, Saratoga, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/755,679

(22) PCT Filed: May 11, 2021

(86) PCT No.: PCT/CN2021/093118
§ 371 (c)(1),
(2) Date: May 5, 2022

(87) PCT Pub. No.: WO2022/236702
PCT Pub. Date: Nov. 17, 2022

(65) Prior Publication Data
US 2024/0163065 A1    May 16, 2024

(51) Int. Cl.
*H04L 5/00* (2006.01)
*H04W 24/08* (2009.01)
*H04W 72/23* (2023.01)

(52) U.S. Cl.
CPC ......... *H04L 5/0053* (2013.01); *H04W 24/08* (2013.01); *H04W 72/23* (2023.01)

(58) Field of Classification Search
CPC .......... H04W 24/08; H04W 72/23–232; H04L 5/0053
See application file for complete search history.

(56) References Cited

U.S. PATENT DOCUMENTS

2020/0389847 A1* 12/2020 Deng ................ H04W 52/0219
2021/0112560 A1    4/2021 Khoshnevisan et al.
(Continued)

FOREIGN PATENT DOCUMENTS

| WO | 2020/010630 | 1/2020 |
|---|---|---|
| WO | 2020/033439 | 2/2020 |
| WO | 2021/027185 | 2/2021 |

OTHER PUBLICATIONS

Asustek, "Enhancements on multiple TRP or panel transmission", 3GPP TSG RAN WG1 #99, R1-1913023, Nov. 22, 2019, 3 sheets.

*Primary Examiner* — Kevin C. Harper
(74) *Attorney, Agent, or Firm* — Fay Kaplun & Marcin, LLP (57) ABSTRACT

A user equipment (UE) is configured to receive, from a serving base station, a configuration for a control resource set (CORESET) including two transmission configuration indicator (TCI) states for a frequency resource, wherein a first TCI state is associated with a beam transmitted from a first transmission and reception point (TRP) and a second TCI state is associated with a beam transmitted from a second TRP, determine, for the beams transmitted from each of the first and second TRPs, respective one or more reference signal (RS) resources to monitor for radio link monitoring (RLM) or beam failure detection (BFD) and monitor the RS transmitted from the first TRP using the first TCI state and the RS transmitted from the second TRP using the second TCI state.

18 Claims, 6 Drawing Sheets

(56) References Cited

U.S. PATENT DOCUMENTS

2023/0309170 A1\* 9/2023 Zhou ................... H04W 76/19
2024/0214142 A1\* 6/2024 Muruganathan ...... H04L 5/0048

\* cited by examiner

RadioLinkMonitoringConfig Information Element 400

```
-- ASN1START
-- TAG-RADIOLINKMONITORINGCONFIG-START

RadioLinkMonitoringConfig ::= SEQUENCE {
405 failureDetectionResourcesToAddModList  SEQUENCE (SIZE(1..maxNrofFailureDetectionResources)) OF RadioLinkmonitoringRS OPTIONAL, -- Need N
410 failureDetectionResourcesToReleaseList SEQUENCE (SIZE(1..maxNrofFailureDetectionResources)) OF RadioLinkmonitoringRS-Id OPTIONAL, -- Need N
415 beamFailureInstanceMaxCount            ENUMERATED {n1, n2, n3, n4, n5, n6, n8, n10}                                  OPTIONAL, -- Need S
420 beamFailureDetectionTimer              ENUMERATED {pbfd1, pbfd2, pbfd3, pbfd4, pbfd5, pbfd6, pbfd8, pbfd10}  OPTIONAL, -- Need R
   ...
};
425 RadioLinkMonitoringRS ::= SEQUENCE {
    radioLinkMonitoringRS-Id    RadioLinkmonitoringRS-Id,
430 purpose                     ENUMERATED {beamFailure, rlf, both},
435 detentionResource           CHOICE {
        ssb-Index                   SSB-Index,
        csi-RS-Index                NZP-CSI-RS-ResourceId
    },
    ...
};

-- TAG-RADIOLINKMONITORINGCONFIG-STOP
-- ASN1STOP
```

RADIO LINK MANAGEMENT, BEAM FAILURE DETECTION AND DEFAULT BEAM ENHANCEMENTS FOR HIGH SPEED TRAIN DEPLOYMENTS

BACKGROUND

A user equipment (UE) may establish a connection to at least one of multiple different networks or types of networks. Signaling between the UE and the network may be achieved via beamforming. Beamforming is an antenna technique used to transmit a directional signal which may be referred to as a beam.

A base station of the network may be configured with multiple transmission and reception points (TRPs) each configured to perform beamforming. For example, the base station may transmit a first beam from a first TRP to the UE and a second beam from a second TRP to the UE. To acquire and maintain a beam between the UE and each of the TRPs, beam management techniques may be implemented on both the UE side and the network side.

SUMMARY

Some exemplary embodiments are related to a processor of a user equipment (UE) configured to perform operations. The operations include receiving, from a serving base station, a configuration for a control resource set (CORESET) including two transmission configuration indicator (TCI) states for a frequency resource, wherein a first TCI state is associated with a beam transmitted from a first transmission and reception point (TRP) and a second TCI state is associated with a beam transmitted from a second TRP, determining, for the beams transmitted from each of the first and second TRPs, respective one or more reference signal (RS) resources to monitor for radio link monitoring (RLM) or beam failure detection (BFD) and monitoring the RS transmitted from the first TRP using the first TCI state and the RS transmitted from the second TRP using the second TCI state.

Other exemplary embodiments are related to a processor of a base station configured to perform operations. The operations include transmitting, to a user equipment (UE), a first configuration for a control resource set (CORESET) including two transmission configuration indicator (TCI) states for a frequency resource, wherein a first TCI state is associated with a beam transmitted from a first transmission and reception point (TRP) and a second TCI state is associated with a beam transmitted from a second TRP and transmitting, to the UE, for the beams transmitted from each of the first and second TRPs, a second configuration for a respective one or more reference signal (RS) resources to monitor for radio link monitoring (RLM) or beam failure detection (BFD), wherein the UE monitors the RS transmitted from the first TRP using the first TCI state and the RS transmitted from the second TRP using the second TCI state.

Still further exemplary embodiments are related to a processor of a user equipment (UE) configured to perform operations. The operations include determining whether one or more conditions are met that require a default transmission configuration indicator (TCI) state to be used for physical downlink shared channel (PDSCH) buffering or decoding, when the conditions are met, determining parameters for the default TCI state based on a current network operation and using the default TCI state for PDSCH buffering or decoding until one or more of the conditions are not met.

DETAILED DESCRIPTION

The exemplary embodiments may be further understood with reference to the following description and the related appended drawings, wherein like elements are provided with the same reference numerals. The exemplary embodiments relate to beam management operations for multi-transmission and reception point (TRP) operation in a single frequency network (SFN) deployment. In particular, some exemplary embodiments relate to network and user equipment (UE) operations in which two transmission configuration indicator (TCI) states are configured in a single control resource set (CORESET), wherein a first one of the TCI states corresponds to communications with a first TRP and a second one of the TCI states corresponds to communications with a second TRP.

When a CORESET includes two TCI states, various legacy operations that assume a CORESET with a single TCI state are impacted. In particular, some exemplary embodiments relate to radio link management (RLM) and beam failure detection/recovery (BFD/BFR) operations for a UE deployed in the multi-TRP SFN arrangement with two TCI states configured in a single CORESET. Other exemplary embodiments relate to default TCI configurations for a UE when two TCI states may be configured in a single CORESET.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any appropriate electronic component.

The exemplary embodiments are also described with regard to a 5G New Radio (NR) network. However, reference to a 5G NR network is merely provided for illustrative purposes. The exemplary embodiments may be utilized with any network that utilizes beamforming. Therefore, the 5G NR network as described herein may represent any type of network that implements beamforming.

A person of ordinary skill in the art would understand that beamforming is an antenna technique that is utilized to transmit or receive a directional signal. From the perspective of a transmitting device, beamforming may refer to propagating a directional signal. Throughout this description, a beamformed signal may be referred to as a "beam" or a "transmitter beam." The transmitter beam may be generated by having a plurality of antenna elements radiate the same signal. Increasing the number of antenna elements radiating the signal decreases the width of the radiation pattern and increases the gain. Thus, a transmitter beam may vary in width and be propagated in any of a plurality of different directions.

From the perspective of a receiving device, beamforming may refer to tuning a receiver to listen to a direction of interest. Throughout this description, the spatial area encompassed by the receiver listening in the direction of interest may be referred to as a "beam" or a "receiver beam." The receiver beam may be generated by configuring the parameters of a spatial filter on a receiver antenna array to listen in a direction of interest and filter out any noise from outside the direction of interest. Like a transmitter beam, a receiver beam may also vary in width and be directed in any of a plurality of different areas of interest.

In addition, the exemplary embodiments are described with regard to a next generation node B (gNB) that is configured with multiple TRPs. Throughout this description, a TRP generally refers to a set of components configured to transmit and/or receive a beam. In some embodiments, multiple TRPs may be deployed locally at the gNB. For example, the gNB may include multiple antenna arrays/panels that are each configured to generate a different beam. In other embodiments, multiple TRPs may be deployed at various different locations and connected to the gNB via a backhaul connection. For example, multiple small cells may be deployed at different locations and connected via backhaul links to the gNB. However, these examples are merely provided for illustrative purposes. Those skilled in the art will understand that TRPs are configured to be adaptable to a wide variety of different conditions and deployment scenarios. Thus, any reference to a TRP being a particular network component or multiple TRPs being deployed in a particular arrangement is merely provided for illustrative purposes. The TRPs described herein may represent any type of network component configured to transmit and/or receive a beam.

Some exemplary embodiments relate to a multi-TRP, single frequency network (SFN) deployment for a UE, particularly for a high speed train (HST) arrangement in which the UE has connections with two TRPs and is rapidly moving away from one of the TRPs and is rapidly moving toward the other one of the TRPs. An SFN is a network in which several transmitters simultaneously send to a UE the same signal over the same frequency to improve the network quality for the UE.

The exemplary embodiments relate to implementing beam management techniques on both the UE side and the network side. Beam management generally refers to a set of procedures configured to acquire and maintain a beam between a TRP and the UE. In one aspect, the exemplary embodiments relate to beam failure detection (BFD) and beam failure recovery (BFR) procedures. BFD generally relates to determining that a serving beam is not providing adequate quality and/or performance in the downlink. BFR generally relates to assisting the network with scheduling subsequent downlink communications using a different beam that is likely to provide adequate quality and/or performance in the downlink. The exemplary beam management techniques described herein may be used in conjunction with currently implemented beam management mechanisms, future implementations of beam management mechanisms or independently from other beam management mechanisms.

In another aspect, the exemplary embodiments relate to default TCI state configurations to be used by the UE under certain conditions. Specifically, these embodiments describe operations for the UE to determine the default TCI state even when the UE knows that a CORESET may be configured with two TCI states. Certain legacy operations for determining a default TCI state assume that a CORESET may be configured with only one TCI state. Thus, if the CORESET is enhanced so that two TCI states may be configured, these legacy operations must also be enhanced so that the potential for two TCI states being configured for the CORESET is taken into account.

Figure 1:
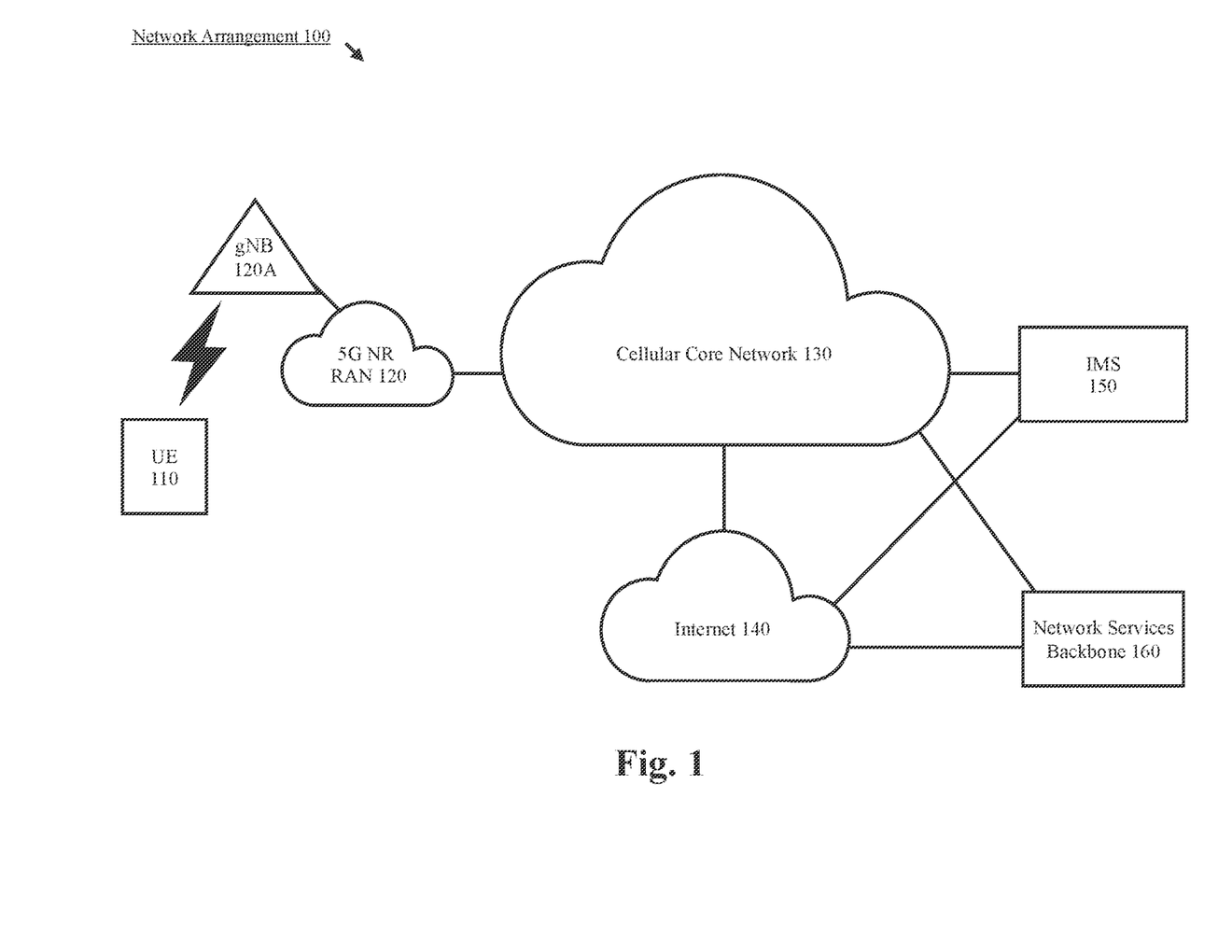
FIG. 1 shows an exemplary network arrangement according to various exemplary embodiments.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g. 5G cloud RAN, a next generation RAN (NG-RAN), a long term evolution RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the NR RAN 120.

The 5G NR RAN 120 may be a portion of a cellular network that may be deployed by a network carrier (e.g., Verizon, AT&T, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

In network arrangement 100, the 5G NR RAN 120 includes a base station (e.g., gNB 120A) that represents a gNB that is configured with multiple TRPs. Each TRP may represent one or more components configured to transmit and/or receive a beam. In some embodiments, multiple TRPs may be deployed locally at the gNB 120A. In other embodiments, multiple TRPs may be distributed at different locations and connected to the gNB.

Figure 2:
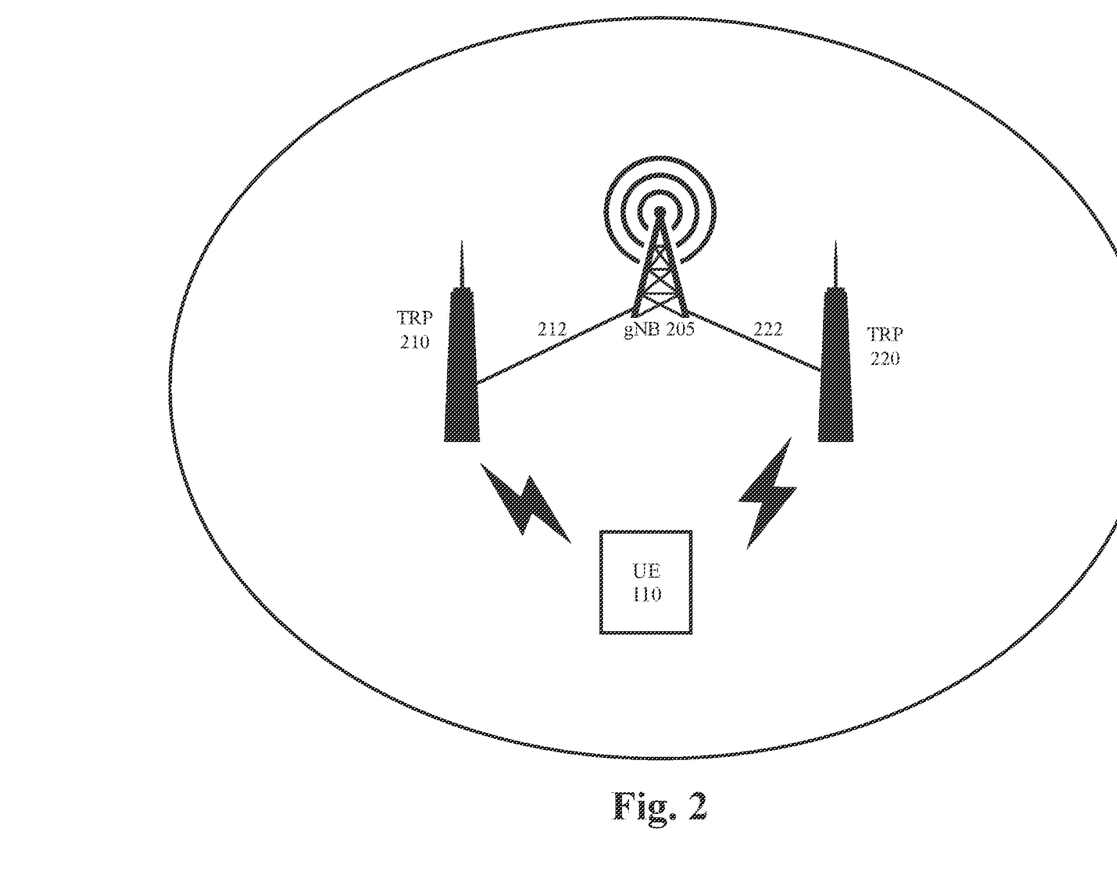
FIG. 2 shows an example of multiple transmission and reception points (TRPs) deployed at different locations according to various exemplary embodiments.

FIG. 2 shows an example of multiple TRPs deployed at different locations. In this example, the gNB 205 is configured with a first TRP 210 via a backhaul connection 212 and a second TRP 220 via backhaul connection 222. Each of the TRPs 210, 220 may transmit a beam to and/or receive a beam from the UE 110. However, the gNB 205 may be configured to control the TRPs 210, 220 and perform operations such as, but not limited to, assigning resources, configuring group pairs, configuring reporting restrictions, implementing beam management techniques, etc.

The example shown in FIG. 2 is not intended to limit the exemplary embodiments in any way. Those skilled in the art will understand that 5G NR TRPs are adaptable to a wide variety of different conditions and deployment scenarios. An actual network arrangement may include any number of different types of base stations, cells and/or TRPs being deployed by any number of RANs in any appropriate arrangement. Thus, the example of a single gNB 120A in FIG. 1 and a single gNB 205 with two TRPs 210, 220 in FIG. 2 is merely provided for illustrative purposes.

Returning to the network arrangement 100 of FIG. 1, the gNB 120A may include one or more communication interfaces to exchange data and/or information with UEs, the corresponding RAN, the cellular core network 130, the internet 140, etc. Further, the gNB 120A may include a processor configured to perform various operations. For example, the processor of the gNB 120A may be configured to perform operations related to radio link monitoring (RLM) and/or beam failure detection/recovery (BFD/BFR), including configuring a UE with radio link monitoring reference signals (RLM RS) from multiple TRPs. However, reference to a processor is merely for illustrative purposes. The operations of the gNB 120A may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some examples, the functionality of the processor is split among two or more processors such as a baseband processor and an applications processor. The exemplary embodiments may be implemented in any of these or other configurations of a cell.

The UE 110 may connect to the 5G NR-RAN 120 via the gNB 120A. Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific cell (e.g., the gNB 120A). However, as mentioned above, reference to the 5G NR-RAN 120 is merely for illustrative purposes and any appropriate type of RAN may be used.

In addition to the 5G NR RAN 120, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 3:
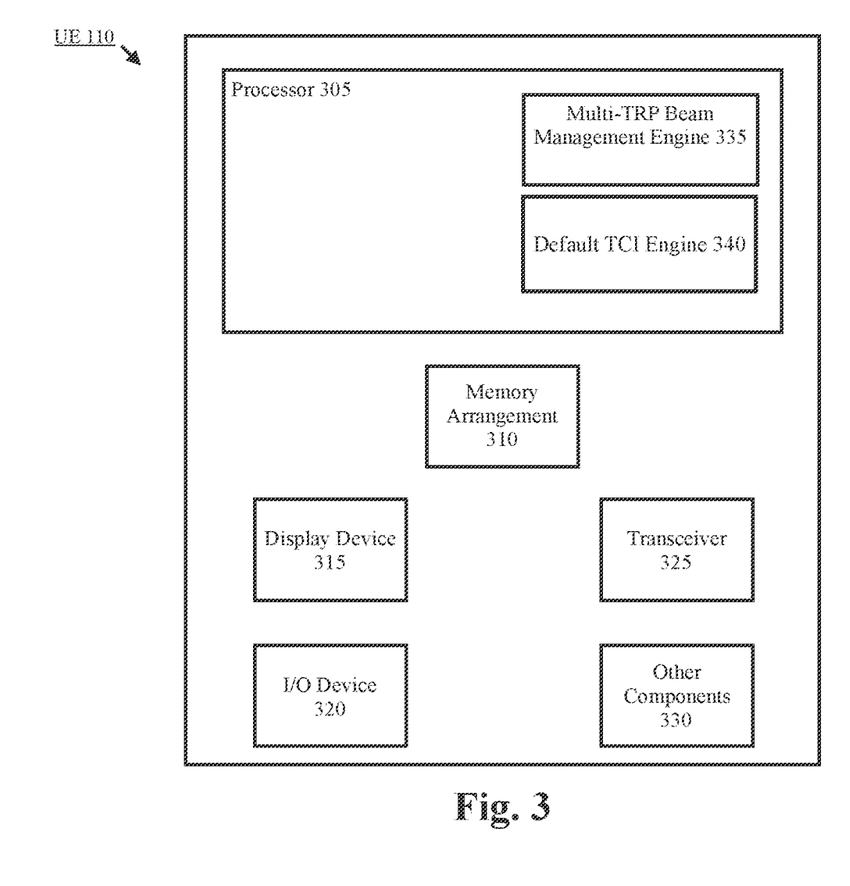
FIG. 3 shows an exemplary user equipment (UE) according to various exemplary embodiments.

FIG. 3 shows an exemplary UE 110 according to various exemplary embodiments. The UE 110 will be described with regard to the network arrangement 100 of FIG. 1. The UE 110 may include a processor 305, a memory arrangement 310, a display device 315, an input/output (I/O) device 320, a transceiver 325 and other components 330. The other components 330 may include, for example, an audio input device, an audio output device, a power supply, a data acquisition device, ports to electrically connect the UE 110 to other electronic devices, etc.

The processor 305 may be configured to execute a plurality of engines of the UE 110. For example, the engines may include a multi-TRP beam management engine 335. The multi-TRP beam management engine 335 may be configured to perform operations related to beam management such as, collecting measurement data, beam selection, beam failure detection, beam failure recovery, etc., to be described in further detail below. The engines may also include a default TCI engine 340. The default TCI engine 340 may be configured to perform operations related to determining a default TCI state to be used under various conditions and/or network deployments, to be described in further detail below.

The above referenced engine being an application (e.g., a program) executed by the processor 305 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 305 is split among two or more processors such as a baseband processor and an applications processor. The exemplary embodiments may be implemented in any of these or other configurations of a UE.

The memory arrangement 310 may be a hardware component configured to store data related to operations performed by the UE 110. The display device 315 may be a hardware component configured to show data to a user while the I/O device 320 may be a hardware component that enables the user to enter inputs. The display device 315 and the I/O device 320 may be separate components or integrated together such as a touchscreen. The transceiver 325 may be a hardware component configured to establish a connection with the 5G NR-RAN 120, an LTE-RAN (not pictured), a legacy RAN (not pictured), a WLAN (not pictured), etc. Accordingly, the transceiver 325 may operate on a variety of different frequencies or channels (e.g., set of consecutive frequencies).

A transmission configuration indicator (TCI) state contains parameters for configuring a quasi co-location (QCL) relationship between one or more reference signals (RS) and corresponding antenna ports. For example, the demodulation reference signal (DMRS) ports of the physical downlink shared channel (PDSCH), the DMRS port of the physical downlink control channel (PDCCH), or the channel state indicator reference signal (CSI-RS) port(s) of a CSI-RS resource set may be associated with a QCL relationship. Two quasi co-located signals experience very similar channel conditions, such that determining the channel properties of one of the signals will substantially aid the channel property determination of the other signal.

Existing QCL types defined in 3GPP TS 38.214 include QCL-TypeA, QCL-TypeB, QCL-TypeC and QCL-TypeD. QCL-TypeA relates to Doppler shift, Doppler spread, average delay and delay spread. QCL-TypeB relates to Doppler shift and Doppler spread. The measurements for types A and B may be used to, for example, determine channel state information (CSI). QCL-TypeC relates to Doppler shift and average delay, and the measurements may be used to, for example, calculate reference signal received power (RSRP). Thus, QCL types A-C relate to timing and frequency error tracking information being shared across the ports corresponding to QCLed signals. QCL-TypeD relates to spatial Rx parameters and is used to support beamforming.

A UE may be configured with a list of up to M TCI state configurations within the higher layer parameters, e.g., M=8, which may be transmitted to the UE from the network in a medium access layer (MAC) control element (CE), a DCI message, or a radio resource control (RRC) activation command.

As defined in NR, a control resource set (CORESET) is a set of resource element groups (REG) (each REG comprising a resource block in the frequency domain and one OFDM symbol in the time domain) within which the UE attempts to blindly decode downlink control information (DCI) from the PDCCH. The CORESET may be considered a set of physical resources, e.g., a specific area on NR Downlink Resource Grid and a set of parameters that is used to carry PDCCH/DCI. For the PDCCH, the DL TCI is configured per CORESET via a MAC-CE. According to existing specifications, one CORESET is configured per MAC-CE.

For multi-TRP operations, beam failure may be triggered for each TRP. Thus, each set of beams may include reference signals (e.g., Radio Link Monitoring RS (RLM RS)) configured for beam failure detection. The UE may collect measurement data corresponding to these reference signals and declare beam failure when a predetermined condition is met (e.g., one or more measurement values fall below a predetermined threshold, etc.). The configured RLM RS resources can be all SSBs, or all CSI-RSs, or a mix of SSBs and CSI-RSs. The UE is not required to perform RLM outside the active DL BWP.

If a beam failure event occurs at a TRP that is operating as a primary cell (PCell), different physical random access channel (PRACH) sequences/configuration may be used to indicate which TRP has beam failure. To provide an example, for a contention free RACH (CFRA) based beam failure request, a radio resource control (RRC) or medium access channel control element (MAC-CE) may be used to indicate which TRP has beam failure. If the beam failure event occurs at a TRP that is operating as a secondary cell (SCell), a MAC-CE may be used to indicate which TRP has beam failure.

When a beam failure event occurs, a UE may implement a beam failure recovery (BFR) that includes an indication of a candidate beam that may be used to replace the current beam for communications with the TRP.

High Speed Train Deployment Enhancements

High Speed Train (HST) is a deployment scenario in which a UE (located on a train) travels between two transmission and reception points (TRPs) deployed along the train line. The UE in this scenario can observe very high positive Doppler shift from one TRP, and very high negative Doppler shift from the other TRP. As a result, the composite channel can vary quickly, e.g., greater than 2 kHz. This can potentially reduce the channel capability and/or make it very challenging for the UE to perform accurate channel estimation. In general, these issues are addressed in the following ways. First, the UE is allowed to estimate two separate Doppler shifts, one from each TRP, to assist UE channel estimation. Second, the network is allowed to pre-compensate for the Doppler shift if the Doppler shift is known to the network.

It may be useful to allow a MAC-CE to configure two TCI states for a CORESET (Control Resource Set) to enhance PDCCH reliability for HST.

Some exemplary embodiments described herein address RLM and BFR enhancements for high speed train (HST) deployments in which two TCI states may be configured for a CORESET. The enhancements include failure detection resource configurations, candidate beam configurations, PDCCH monitoring after beam failure detection (BFD), and PUCCH transmission after BFD, to be described in further detail below.

In some other exemplary embodiments, default TCI configurations are described for various network deployments that may include a CORESET configured with two TCI states. The default TCI configurations are described with respect to Single-TRP PDSCH, Multi-TRP PDSCH, HST-SFN PDSCH and AP-CSI-RS. Some aspects further relate to operations for addressing PDCCH monitoring collisions with different QCL-TypeD.

RLM and BFR for Multi-TRP SFN Deployments

For multi-TRP operations, beam failure may be triggered for each TRP. Thus, each set of beams (from each TRP) may include reference signals (e.g., Radio Link Monitoring RS) configured for beam failure detection. The UE may collect measurement data corresponding to these reference signals and declare beam failure when a predetermined condition is met (e.g., one or more measurement values fall below a predetermined threshold, etc.).

According to existing standards, the serving gNB configures a UE for radio link monitoring (RLM) and/or beam failure detection (BFD) using a RadioLinkMonitoringConfig information element.

Figure 4:
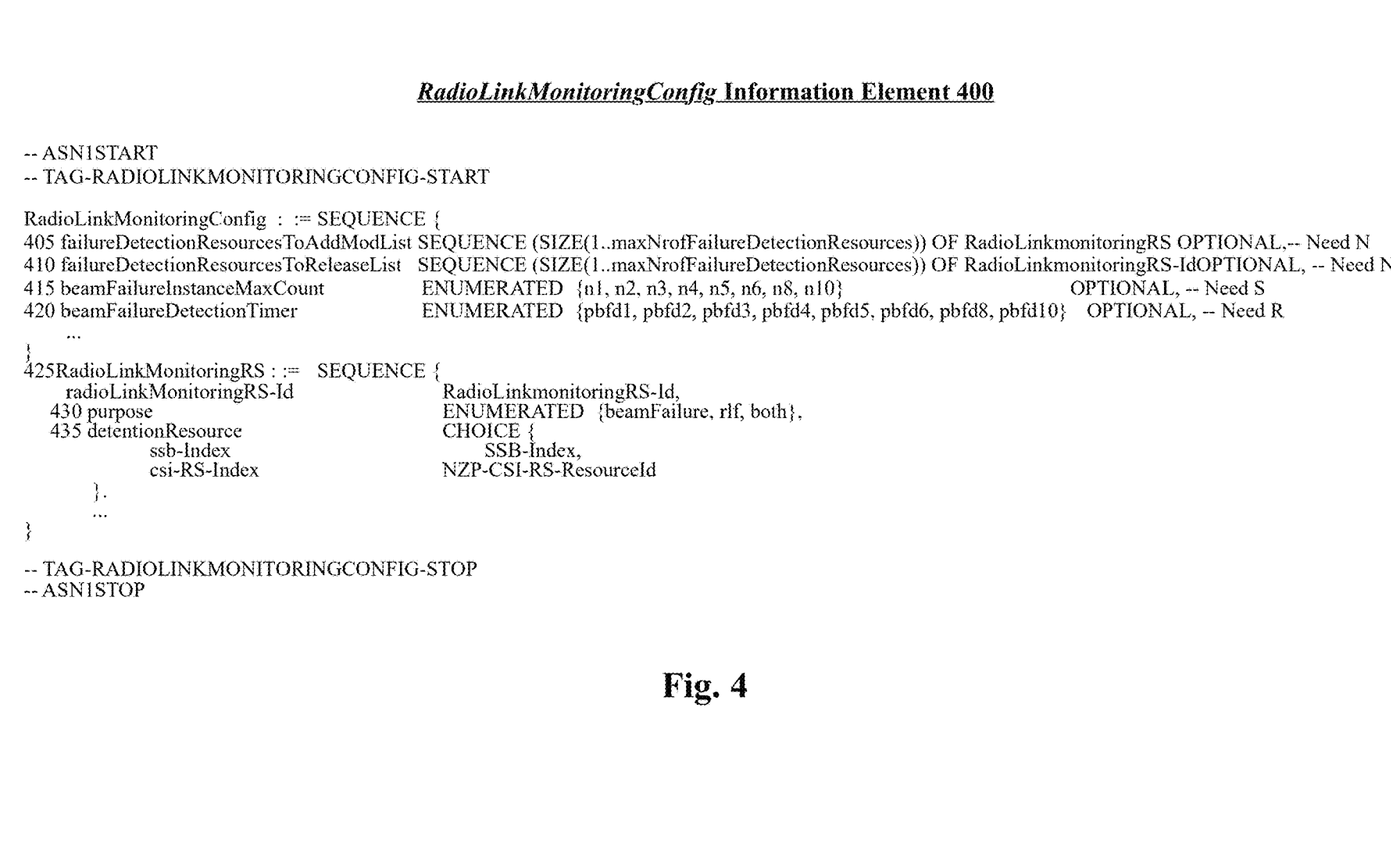
FIG. 4 shows a RadioLinkMonitoringConfig IE according to various exemplary embodiments.

FIG. 4 shows a RadioLinkMonitoringConfig IE 400 including the parameters failureDetectionResourcesToAddModList 405, failureDetectionResourcesToReleaseList 410, beamFailureInstanceMaxCount 415, and beamFailureDetectionTimer 420. Parameter 405 includes a list of reference signals for detecting beam failure (BF) and/or radio link failure (RLF). The reference signals are indicated in a RadioLinkMonitoringRS IE 425, which includes the parameters' purpose 430 and detectionResource 435. The detectionResource parameter 435 indicates one or two RS that the UE is to use for RLM and the purpose parameter 430 indicates whether the UE is to monitor the associated RS for radio link failure (cell-failure), beam failure, or both. The detectionResources 435 may comprise an SSB, a CSI-RS or both.

The parameter 410 may include a list of configured RS to remove from RLM/BFD operations. The parameter 415 indicates how many beam failure events trigger beam failure recovery, and the parameter 420 indicates a timer for beam failure detection.

The UE in a single frequency network (SFN) including multiple TRPs may determine which RLM RS to monitor for radio link failure (RLF) and beam failure (BF) detection according to the following exemplary embodiments. The exemplary embodiments will be described relative to a two-TRP SFN arrangement. However, in future releases, additional TRPs may be added to the SFN arrangement. Thus, the person skilled in the art would understand that the exemplary embodiments described herein may be expanded to include additional TRPs and are not limited to only two-TRP deployments.

In a first exemplary embodiment, one or more RadioLinkMonitoringRS IE are explicitly configured for the UE in the RadioLinkMonitoringConfig IE according to one of the following options.

In a first option, only one set of RadioLinkMonitoringRS is configured for the UE. That is, only one failureDetectionResourcesToAddModList parameter is configured, including a list of one or more RadioLinkMonitoringRS. The RLM RS (detectionResources) included in a particular RadioLinkMonitoringRS may be mapped to one of the individual TRPs in the following ways.

In some exemplary embodiments, each RadioLinkMonitoringRS in the set can be configured with only one detectionResource, i.e., one RLM RS that is an SSB or a CSI-RS. In such a case, the RadioLinkMonitoringRS (and the corresponding single detectionResource) may be logically mapped to a particular TRP, i.e., determined by the UE to be included in a beam received from a particular TRP. For example, the first N RadioLinkMonitoringRS in the set may be mapped to the beam of a first TRP, and the second N RadioLinkMonitoringRS in the set may be mapped to the beam a second TRP.

In other exemplary embodiments, each RadioLinkMonitoringRS in the set can be configured with one detectionResource or two detectionResources. In such a case, the first detectionResource in each RadioLinkMonitoringRS in the set may be logically mapped to a first TRP, and the second detectionResource in each RadioLinkMonitoringRS in the set may be logically mapped to a second TRP.

In a second option, two sets of RadioLinkMonitoringRS are configured for the UE. That is, a first failureDetectionResourcesToAddModList parameter and a second failureDetectionResourcesToAddModList parameter is configured in the RadioLinkMonitoringConfig IE, each including a list of RadioLinkMonitoringRS, wherein the first is mapped to a first TRP and the second is mapped to a second TRP. Thus, one RadioLinkMonitoringRS set is configured for each beam transmitted from each one of the two TRPs. In this option, each RLM RS can be configured with only one detectionResource.

According to a second exemplary embodiment, the RadioLinkMonitoringRS are not explicitly configured in the RadioLinkMonitoringConfig IE. In such a case, the UE determines to monitor, for RLM/BFD, RS that are used for PDCCH receptions. However, multiple RS may be used for PDCCH reception across multiple CORESETs, and multiple TCI may be configured in one or more of the CORESETs as described above. The following options are available for the UE to determine which RS to monitor for RLM.

In a first option, the UE monitors the RS that are used for PDCCH reception only in the CORESET(s) that are configured with a single TCI State. This option follows currently specified UE behavior when a RadioLinkMonitoringRS is not explicitly configured. Thus, only the RS from one of the two TRPs will be monitored.

In a second option, the UE monitors the RS that are used for PDCCH reception in the CORESET(s) that are configured with either one TCI State or two TCI States. This option allows all the RS used for PDCCH reception, from both TRPs, to be considered, subject to the dropping rule described below. In a third option, the UE monitors the RS that is used for PDCCH reception only in the CORESET(s) that are configured with two TCI States.

With respect to the second exemplary embodiment, the number of RS that are used for PDCCH receptions across multiple CORESETs may exceed the maximum number of failure detection RS (RLM RS) the UE can monitor. The maximum number of RLM RS may be hard-encoded in UE specification. For example, the maximum number of RLM RS used for RLF may be four, and the maximum number of RLM RS used for BFR may be two. Regarding how to count the number of RS used for failure detection, for determining whether the number is within the specified maximum limit, the following options are available.

In a first option, the PDCCH with two TCI states is counted as two RSs. In a second option, the PDCCH with two TCI states is counted as one RS.

When the number of failure detection RS (in this case, the number of RS for PDCCH receptions used as RLF RS, according to the previously described options) is exceeded, the following options are available regarding the RS dropping rules, i.e., which RS are dropped for failure detection.

In a first option, the RS for the PDCCH with one configured TCI state have a higher priority relative to the RS for the PDCCH with two configured TCI States. In a second option, the RS for the PDCCH with two configured TCI states have a higher priority relative to the RS for the PDCCH with one configured TCI state. In a third option, there is no priority difference with respect to TCI states configured for the PDCCH. That is, existing rules may be used to determine RS dropping that do not consider the TCI states for the PDCCH.

According to a third exemplary embodiment, the following options are available for calculating the hypothetical PDCCH block error rate (BLER) used for determining RLF/BF. The criteria for the UE to declare RLF and/or BF is based on a threshold BLER value, so the hypothetical BLER is calculated to determine whether RLF/BF is to be declared.

According to a first option, if each RadioLinkMonitoringRS can be configured with only one single detectionResource, the hypothetical PDCCH BLER is measured based on each RadioLinkMonitoringRS independently. Thus, the PDCCH BLER is measured for the beams from each TRP independently of measurements for the beams of the other TRP.

According to a second option, if each RadioLinkMonitoringRS can be configured with only one single detectionResource, the network can also configure one or multiple pairs of RadioLinkMonitoringRS for hypothetical PDCCH BLER measurement. For each pair, the UE assumes enhanced PDCCH transmission scheme 1 (SFN) with two TCI states, each TCI State corresponding to one RadioLinkMonitoringRS in the pair. Thus, in the second option, the UE determines the PDCCH BLER jointly for the beams from both TRPs.

According to a third option, if each RadioLinkMonitoringRS can be configured with either one or two detectionResources, the hypothetical PDCCH BLER is measured based on each RadioLinkMonitoringRS independently. As discussed above, when two detectionResources are configured per RadioLinkMonitoringRS, the first detectionResource may map to a first TRP and the second detectionResource may map to a second TRP. Thus, for RadioLinkMonitoringRS configured with two detectionResources, the UE assumes enhanced PDCCH transmission scheme 1 (SFN) with the same two TCI states corresponding to each detection Resource. Thus, in the third option, the UE determines the PDCCH BLER jointly for the beams from both TRPs.

Failure Candidate Beam Configuration

As described above, certain RS transmitted from the multiple TRPs are used to monitor configured beams and detect beam failure. Other ones of the RS transmitted from the multiple TRPs may be used to monitor candidate beams that may be used when beam failure is detected on the configured beams. The beam failure recovery (BFR) procedure includes an indication to the network of BF on a configured beam and an indication of a candidate beam that may be used instead of the currently configured beam. If the network determines the candidate beam to be suitable, an explicit reconfiguration of the beam will follow.

For an SpCell (special cell), i.e., the primary cell (PCell) in a master cell group (MCG) or the primary secondary cell (PSCell) in a secondary cell group (SCG), the candidate beam detection (CBD) RS are configured in the parameter candidateBeamRSList in the IE BeamFailureRecoveryConfig. For the CBD RS configuration from an SpCell, the CBD RS may be configured only on the same SpCell. For an SCell, the CBD RS are configured in the parameter candidateBeamRSSCellList in the IE BeamFailureRecoveryS-CellConfig. For the CBD RS configuration from an SCell, the CBD RS can be configured in a different cell. In the following embodiments, the candidateBeamRSList for the SpCell may include multiple PRACH-ResourceDedicatedBFR, each including one or two CBD RS, and the candidateBeamRSSCellList may include multiple candidateBeamRS, each including one or two CBD RS. In the following, for ease of explanation, the PRACH-ResourceDedicatedBFR and the candidateBeamRS will each be referred to as a "CBD RS IE".

According to a first exemplary embodiment, for CBD RS configuration for multiple TRPs in an SFN deployment, the following options are available. The options for the CBD RS configuration are similar to those described above for RLM RS configuration.

In a first option, only one set of CBD RS IE is configured for the UE. That is, only one candidateBeamRSList or candidateBeamRSSCellList is configured in a respective SpCell or SCell beam failure recovery configuration, the parameter including a list of one or more CBD RS IEs. Each CBD RS included in the CBD RS IEs in the list may be mapped to one of the individual TRPs in the following ways.

In one alternative, each CBD RS IE in the CBD RS IE set can be configured with only one CBD RS. Similar to the RadioLinkMonitoringRS described above, the CBD RS IE (and the corresponding single CBD RS) may be logically mapped to a particular TRP. In another alternative, each CBD RS IE in the CBD RS IE set can be configured with one CBD RS or two CBD RS. In this case, the first CBD RS in each CBD RS IE may be logically mapped to a first TRP, and the second CBD RS in each CBD RS IE may be logically mapped to a second TRP.

In a second option, two sets of CBD RS IEs are configured for the UE. That is, a first candidateBeamRSList or candidateBeamRSSCellList and a second candidateBeamRSList or candidateBeamRSSCellList is configured, each including a list of CBD RS IEs, wherein the first set is mapped to a first TRP and the second set is mapped to a second TRP. In this option, each CBD RS IE can be configured with only one RS.

According to a second exemplary embodiment, to determine whether the candidate beam is valid, the following options are available. As will be described further below in the third exemplary embodiment, the candidate beam is measured using some channel quality metric, e.g., RSRP, and the measured value is compared to a threshold value to determine whether the candidate beam may be used (switched to) if BF is determined for a current beam. The second exemplary embodiment relates to which configured CBD RS are to be measured to determine the measurement value.

According to a first option, if the CBD RS IE can be configured with only one CBD RS, the candidate beam quality is measured based on each CBD RS independently. Thus, the quality of the beams are measured for each TRP independently of measurements for beams of the other TRP.

According to a second option, if the CBD RS IE can be configured with only one CBD RS, the network can also configure one or multiple pairs of CBD RS IE for candidate beam quality measurement. For each pair, the UE assumes enhanced PDCCH transmission scheme 1 (SFN) with two TCI states, each TCI State corresponding to one CBD RS IE in the pair. Thus, in the second option, the UE determines the CBD measurement jointly using RS from both TRPs.

According to a third option, if each CBD RS IE can be configured with either one or two CBD RS, the candidate beam quality is measured based on each CBD RS IE independently. For CBD RS IEs configured with two CBD RS, the UE assumes enhanced PDCCH transmission scheme 1 (SFN) with the same two TCI states corresponding to each CBD RS in the CBD RS IE. Thus, in the third option, the UE determines the CBD measurement jointly using RS from both TRPs.

For candidate beam measurement based on the CBD RS IE with two CBD RS, the following options are available. In a first option, the candidate beam measurement is based on RSRP, similar to existing specifications. When the UE performs RSRP measurements based on two CBD RS in the CBD RS IE, the measured RSRP should be larger than or equal to the RSRP measurement of any single CBD RS of the two CBD RS. However, this RSRP measurement fails to account for interference that may be caused between the two beams coming from opposite directions.

In a second option, the candidate beam measurement is based on the hypothetical PDCCH BLER. The measured hypothetical PDCCH quality should be better than or equal to the PDCCH BLER threshold. The UE assumes enhanced PDCCH transmission scheme 1 (SFN) with the same two TCI states corresponding to each CBD RS of the two CBD RS.

For SpCell candidate beam reporting, when a valid candidate beam can contain up to two CBD RSs, the UE can select any one of the CBD RS and use the corresponding PRACH resource for the selected CBD RS for PRACH transmission. The UE can further report the pair of CBD RS in the UL MAC-CE based on the contention based PRACH processing (CBRA).

For SCell candidate beam reporting, when a valid candidate beam can contain up to two CBD RSs, the UE can further report the pair of CBD RS in the UL MAC-CE, relative to existing specifications where only a single RS can be reported PDCCH Monitoring After BFD For the SpCell, once BF is detected, the UE transmits a beam failure recovery request (BFRQ) on the PRACH. After the UE transmits the BFRQ, four slots later, the UE starts to monitor the PDCCH for a new beam configuration in the configured recoverySearchSpaceId. The UE uses the same QCL parameters for the PDCCH monitoring as the QCL parameters assumed by the UE for the PRACH transmission, i.e., those of the reported recovery beam, until the UE receives a new network configuration to change the TCI of the corresponding CORESETs. In other words, the UE reports a candidate beam to the network for BFR and monitors the same beam for the BFR confirmation from the network, until an explicit reconfiguration is received.

For SpCell/SCell, once BF is detected, the UE reports the BF and the detected candidate beam in an UL MAC-CE. After sending the report, the UE monitors the DL DCI. If the DL DCI schedules a new HARQ transmission for the same HARQ process used for UL MAC-CE, the beam failure recovery is successful. Twenty-eight (28) symbols after the detection of DL DCI that indicates successful beam failure recovery, the UE changes the QCL for PDCCH monitoring before the network reconfigures the TCI of the corresponding CORESETs.

The following options are available with respect to QCL parameters used for PDCCH monitoring. In a first option, if the UE reports only one CBD RS in the UL MAC-CE, the UE uses the QCL parameters corresponding to the reported CBD RS. If the UE reports two CBD RS in the UL MAC-CE, according to a second option, the UE uses QCL parameters corresponding to both CBD RS. In this option, the UE assumes enhanced PDCCH transmission scheme 1 (SFN) with the same two TCI states corresponding to each RS in the two RS. In a third option, the UE uses QCL parameters corresponding to one CBD RS of the two CBD RS.

PUCCH Transmission After BFD

For SpCell/SCell BFR, after the UE reports the beam failure and the detected candidate beam in UL MAC-CE, the UE monitors the DL DCI, as described above. Twenty-eight (28) symbols from the last symbol of the PDCCH reception that determines the completion of beam failure recovery, the UE updates its PUCCH in the following ways until the network reconfigures the PUCCH QCL.

If the UE reports only one CBD RS in the UL MAC-CE, the UE uses the QCL parameters and the power control setting corresponding to the reported CBD RS for PUCCH transmissions. If the UE reports two CBD RS in the UL MAC-CE, a fixed one of the two CBD RS is used for QCL parameters and the power control settings for PUCCH transmissions. For example, the first CBD RS or the second CBD RS may be used.

Figure 5:
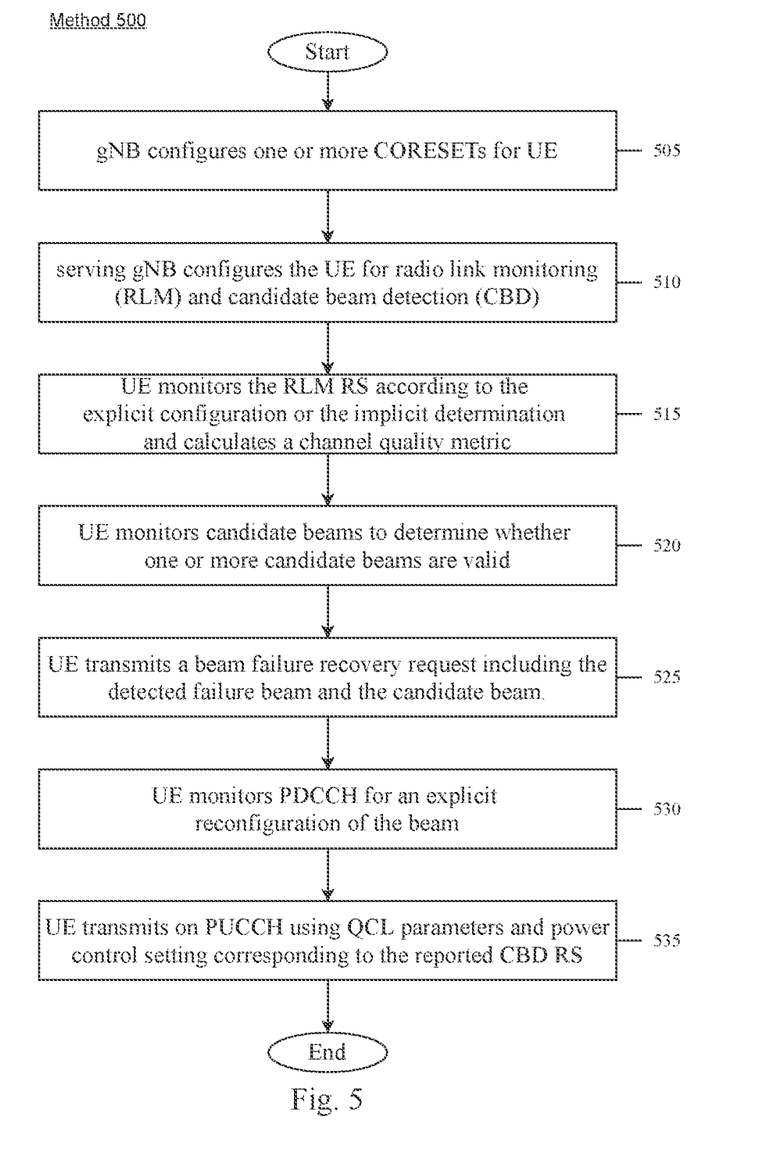
FIG. 5 shows a method for beam failure detection and recovery (BFD/BFR) in a single frequency network (SFN) deployment including multiple transmission and reception points (TRPs) according to various exemplary embodiments.

FIG. 5 shows a method 500 for beam failure detection and recovery (BFD/BFR) in a single frequency network (SFN) deployment including multiple transmission and reception points (TRPs). In the SFN, the multiple TRPs each transmit a same signal to a user equipment (UE) on a same frequency. The control resource set (CORESET) configuring the frequency resource may include two TCI states, one for the beam from a first TRP and the other for the beam from a second TRP.

In 505, the gNB configures one or more CORESETs for the UE. When the UE is operating in a multi-TRP SFN network, at least one CORESET includes multiple TCI state indications, wherein each TCI state corresponds to a different one of the TRPs. At least one CORESET may also include a single TCI state indication, corresponding to only a single TRP.

In 510, the serving gNB configures the UE for radio link monitoring (RLM) and candidate beam detection (CBD). For example, the serving gNB transmits a RadioLinkMonitoringConfig information element (IE) containing parameters including a list of RS resources (RLM RS) for detecting RLF and/or BF, and further transmits a BeamFailureRecoveryConfig IE (for SpCell) and/or a BeamFailureRecoverySCellConfig (for SCell) including a list of RS resources (CBD RS) for the UE to monitor as candidate beams. When the UE is operating in a multi-TRP SFN network, the RS resources include RS to be transmitted from each of the multiple TRPs.

The RLM configuration may further include an explicit configuration of the RLM RS, using e.g., one or more RadioLinkMonitoringRS IEs indicating one or more RS to monitor. As discussed above, the RadioLinkMonitoringConfig IE may include only one set of RadioLinkMonitoringRS IEs, wherein each RadioLinkMonitoringRS in the set is logically mapped to one of the two TRPs, or the RadioLinkMonitoringConfig IE may include two sets of RadioLinkMonitoringRS, wherein a first set is logically mapped to a first TRP and a second set is logically mapped to a second TRP. The mapping of the RLM RS to a particular TRP may be based on whether the RadioLinkMonitoringRS is configured with one RS or two RS.

The RLM configuration may not include an explicit configuration of RadioLinkMonitoringRS, in which case the UE will monitor the RS that is used for PDCCH receptions according to some predefined rules. For example, the UE may determine to monitor only the RS that is used for PDCCH reception in the CORESET that is configured with a single TCI state, only the RS that is used for PDCCH reception in the CORESET that is configured with multiple TCI states, or both. When the number of RS meeting this criteria exceeds a maximum number allowed for failure detection, the UE counts and drops RS according to some further predefined rules.

The CBD configuration may be performed according to various options similar to those discussed above for the RLM configuration. The configuration will be different for CBD on an SpCell and for CBD on an SCell. For example, the SpCell CBD configuration is performed on the PRACH, while the SCell CBD configuration is performed via MAC-CE. The UE may be configured with a single set of CBD RS IE, each of the IEs including one or two CBD RS, logically mapped to one of the two TRPs. Alternatively, the UE may be configured with two sets of CBD RS IE, each of the IEs including one CBD RS, wherein the first set is mapped to a first TRP and the second set is mapped to a second TRP.

In 515, the UE monitors the RLM RS according to the explicit configuration or the implicit determination, as described above, and calculates a channel quality metric, e.g., a hypothetical PDCCH block error rate (BLER). The PDCCH BLER may be determined based on each RadioLinkMonitoringRS independently, or pairs of RadioLinkMonitoringRS may be combined so that the channel quality can be determined jointly using RS from both TRPs. When beam failure is detected, the method proceeds to 520.

In 520, the UE monitors candidate beams, e.g., CBD RS, to determine whether one or more candidate beams are valid, e.g., may be switched to from the current beam after beam failure. The quality for the candidate beams may be measured independently for each TRP or jointly. The measurement may be an RSRP measurement or may be a PDCCH BLER measurement.

In 525, when a valid candidate beam is found, the UE transmits a beam failure recovery request (on the PRACH for an SpCell and via MAC-CE for an SCell) including the detected failure beam and the candidate beam.

In 530, the UE monitors the PDCCH for an explicit reconfiguration of the beam, using the QCL parameters assumed for the beam failure recovery request. If two candidate beams are reported, the UE uses the QCL parameters for one or both of the candidate beams.

In 535, the UE transmits on the PUCCH using the QCL parameters and the power control setting corresponding to the reported CBD RS. If two candidate beams are reported, the UE uses the QCL parameters for one of the candidate beams.

Default TCI for Single-TRP PDSCH

A default TCI for different PDSCH scheduling is needed for the following scenarios. First, the default TCI is needed when the "Transmission configuration indication" is not configured in the DCI that schedules the PDSCH. Second, the default TCI is needed when the time offset between the reception of the DL DCI (including a TCI) and the corresponding PDSCH of a serving cell is less than a threshold timeDurationForQCL. The timeDurationForQCL defines a minimum number of symbols required by the UE to perform PDCCH reception and apply spatial QCL information received in the DCI for PDSCH processing.

In existing specification, the TCI state for PDSCH may follow a default TCI state that corresponds to the TCI state configured for the CORESET associated with the lowest controlResourceSetId in the latest slot in which one or more CORESETs within the active BWP of the serving cell are monitored by the UE.

As described above, in upcoming releases, multiple TCI states may be configured per CORESET. Having multiple TCI states configured per CORESET necessarily requires specification enhancements for specified operations that assume a single TCI state is configured per CORESET.

According to one embodiment, when certain conditions are met, the UE may not be expected to operate in default TCI operation.

The conditions, according to the first embodiment, may be that the "Transmission configuration indication" in the DCI scheduling the PDSCH is required to be configured and that the time offset between the reception of the DCI and the corresponding PDSCH of a serving cell is required to be equal to or greater than the threshold timeDurationForQCL. These conditions may be applicable during single-TRP PDSCH operation that is semi-statically configured by RRC, single-TRP PDSCH operation that is semi-statically configured by MAC-CE, or dynamic DCI-based switching between single-TRP and multi-TRP that is configured by the network.

According to a second embodiment, the following options may be used for the default TCI for single-TRP PDSCH operation.

In a first option, the QCL parameter(s) used for the default TCI are those used for the CORESET associated with the lowest controlResourceSetId in the latest slot in which one or more CORESETs within the active BWP of the serving cell are monitored by the UE, similar to legacy operation, when this identified CORESET is configured with one TCI state.

If the CORESET is configured with two TCI states, the following alternatives are available. In a first alternative, a specified rule may be defined that determines which of the two TCI states the UE should use (either the first or the second). In a second alternative, it is up to UE implementation to select one TCI State. In a third alternative, both TCI states should be used by the UE to buffer the PDSCH data, and it is up to UE implementation to select which TCI State is to be used for PDSCH reception.

In a second option, the QCL parameter(s) used for the default TCI are those used for the CORESET configured with a single TCI State associated the lowest controlResourceSetId in the latest slot in which one or more CORESETs within the active BWP of the serving cell are monitored by the UE. The second option is similar to the first option, however further including the condition that only CORESETs with a single TCI state are considered when determining the default TCI.

In a third option, among all the TCI codepoints activated for PDSCH, the TCI codepoint with the lowest ID is used for the default TCI.

Multi-TRP PDSCH

For multi-DCI multi-TRP PDSCH operation, a CORESET may be configured/associated with different CORESETPoolindex. For this operation scenario, it may be specified that a CORESET cannot be configured with two TCI states. Thus, this type of multi-DCI multi-TRP PDSCH operation may be unaffected by the TCI enhancements discussed above for multi-DCI multi-TRP PDSCH operation, where the CORESET can be configured with two TCI states.

If the CORESET can be configured with two TCI states in multi-DCI multi-TRP PDSCH operation, the default TCI for this operation scenario may be determined according to one or multiple of the following options.

In a first option, the QCL parameter(s) used for the default TCI may be those used for the CORESET associated with the same CORESETPoolindex, with the lowest controlResourceSetId in the latest slot in which one or more CORESETs within the active BWP of the serving cell are monitored by the UE, similar to legacy operation, when this identified CORESET is configured with one TCI state.

If the identified CORESET is configured with two TCI states, the following alternatives may be used. In a first alternative, a specified rule may be defined that determines which of the two TCI States the UE should use (either the first or the second). In a second alternative, it is up to UE implementation to select one TCI State for the default TCI.

In a second option, the QCL parameter(s) used for the default TCI are those used for the CORESET configured with a single TCI State associated with the same CORESETPoolindex, with the lowest controlResourceSetId in the latest slot in which one or more CORESETs within the active BWP of the serving cell are monitored by the UE. The second option is similar to the first option, however further including the condition that only CORESETs with a single TCI state are considered when determining the default TCI.

For single-DCI multi-TRP PDSCH operation, for determining the default TCI, one or multiple of the following options can be used. In a first option, the QCL parameter(s) used for the default TCI are those used for the CORESET associated with the lowest controlResourceSetId in the latest slot in which one or more CORESETs within the active BWP of the serving cell are monitored by the UE, similar to legacy operation, when this identified CORESET is configured with one TCI state.

In a second option, the QCL parameter(s) used for the default TCI are those used for the CORESET configured with two TCI States associated with the same CORESETPoolindex, with the lowest controlResourceSetId in the latest slot in which one or more CORESETs within the active BWP of the serving cell are monitored by the UE. The second option is similar to the first option, however further including the condition that only CORESETs with two TCI states are considered when determining the default TCI.

In a third option, among all the TCI codepoints activated for PDSCH, the TCI codepoint with the lowest ID is used for the default TCI. In a fourth option, among all the TCI codepoints activated for PDSCH that have two TCI states, the TCI codepoint with the lowest ID is used for the default TCI.

HST-SFN

For HST-SFN PDSCH operation, the default TCI may be determined according to one or multiple of the following options.

In a first option, the QCL parameter(s) used for the default TCI may be those used for the CORESET associated with the lowest controlResourceSetId in the latest slot in which one or more CORESETs within the active BWP of the serving cell are monitored by the UE, similar to legacy operation, when this identified CORESET is configured with one TCI state.

In a second option, the QCL parameter(s) used for the default TCI may be those used for CORESET configured with two TCI States associated with the same CORESETPoolindex, with the lowest controlResourceSetId in the latest slot in which one or more CORESETs within the active BWP of the serving cell are monitored by the UE. The second option is similar to the first option, however further including the condition that only CORESETs with two TCI states are considered when determining the default TCI.

In a third option, among all the TCI codepoints activated for PDSCH, the TCI codepoint with the lowest ID is used for the default TCI. In a fourth option, among all the TCI codepoints activated for PDSCH that have two TCI states, the TCI codepoint with the lowest ID is used for the default TCI.

When the number of TCI states indicated in the DCI is different from the number of TCI states from the default TCI, especially when the number is smaller, i.e., the number of TCI states indicated in the DCI=1 and the number of default TCI states=2, the following options may be used. In a first option, it is up for UE implementation how to decode PDSCH. In a second option, the UE selects one of the TCI that is indicted in the DCI for PDSCH decoding, if the indicated TCI is included in the default TCI states.

Default TCI for AP-CSI-RS

Default TCI for aperiodic CSI-RS (AP-CSI-RS) is needed when the scheduling offset between the last symbol of the PDCCH carrying the triggering DCI and the first symbol of the aperiodic CSI-RS resources is smaller than the UE reported threshold beamSwitchTiming.

When multi-DCI multi-TRP is configured, i.e., the CORESET is associated with a different CORESETPoolindex, the following options are available for determining the default TCI for AP-CSI-RS. In a first option, the QCL parameter(s) used for the default TCI may be those used for the CORESET associated with the same CORESETPoolindex, with the lowest controlResourceSetId in the latest slot in which one or more CORESETs within the active BWP of the serving cell are monitored by the UE, similar to legacy operation, when this identified CORESET is configured with one TCI state.

If the CORESET is configured with two TCI states, in a first alternative, a specified rule may be defined that determines which of the two TCI States the UE should use (either the first or the second). In a second alternative, it is up to UE implementation to select one TCI State for the default TCI.

In a second option, the QCL parameter(s) used for the default TCI may be those used for CORESET configured with a single TCI State associated with the same CORESETPoolindex, with the lowest controlResourceSetId in the latest slot in which one or more CORESETs within the active BWP of the serving cell are monitored by the UE. The second option is similar to the first option, however further including the condition that only CORESETs with a single TCI state are considered when determining the default TCI.

When multi-DCI multi-TRP is not configured, i.e., the CORESET is not associated with different CORESETPoolindex, the following options are available. In a first option, the QCL parameter(s) used for the default TCI may be those used for CORESET associated with the lowest controlResourceSetId in the latest slot in which one or more CORESETs within the active BWP of the serving cell are monitored by the UE. If the CORESET is configured with two TCI states, the following alternatives may be used. In a first alternative, a specified rule may be defined that determines which of the two TCI States the UE should use (either the first or the second). In a second alternative, it is up to UE implementation to select one TCI State for the default TCI.

In a second option, the QCL parameter(s) used for the default TCI may be those used for CORESET configured with single TCI State associated with the lowest controlResourceSetId in the latest slot in which one or more CORESETs within the active BWP of the serving cell are monitored by the UE. The second option is similar to the first option, however further including the condition that only CORESETs with a single TCI state are considered when determining the default TCI.

PDCCH Monitoring Collision with Different QCL-TypeD

According to current specification, if a UE is configured for single cell operation or for operation with carrier aggregation in a same frequency band, and the UE monitors PDCCH candidates in overlapping PDCCH monitoring occasions in multiple CORESETs that have been configured with same or different qcl-Type set to "typeD" properties on active DL BWP(s) of a cell from one or more cells, the following rules are specified.

The UE monitors PDCCHs only in a CORESET, and in any other CORESET from the multiple CORESETs that have been configured with qcl-Type set to same 'typeD' properties as the CORESET, on the active DL BWP of a cell from the one or more cells. The CORESET corresponds to the CSS set with the lowest index in the cell with the lowest index containing CSS, if any; otherwise, to the USS set with the lowest index in the cell with lowest index. The lowest USS set index is determined over all USS sets with at least one PDCCH candidate in overlapping PDCCH monitoring occasions. For the purpose of determining the CORESET, a SS/PBCH block is considered to have different QCL 'typeD' properties than a CSI-RS. For the purpose of determining the CORESET, a first CSI-RS associated with a SS/PBCH block in a first cell and a second CSI-RS in a second cell that is also associated with the SS/PBCH block are assumed to have same QCL 'typeD' properties. The allocation of non-overlapping CCEs and of PDCCH candidates for PDCCH monitoring is according to all search space sets associated with the multiple CORESETs on the active DL BWP(s) of the one or more cells. The number of active TCI states is determined from the multiple CORESETs.

In current specifications, when the UE monitors time domain overlapping multiple CORESETs that have been configured with different qcl-Type set to 'typeD' properties on active DL BWP(s) of one or more cells, while some CORESET is configured with two TCI states, the following options are available.

In a first option, the UE still follows existing standardized rules, e.g., CCS set has higher priority than USS set, search space with lower index has higher priority, cell having lower index has higher priority.

In a second option, the UE follows an additional rule wherein the search space with CORESET configured with two TCI State has higher priority.

Figure 6:
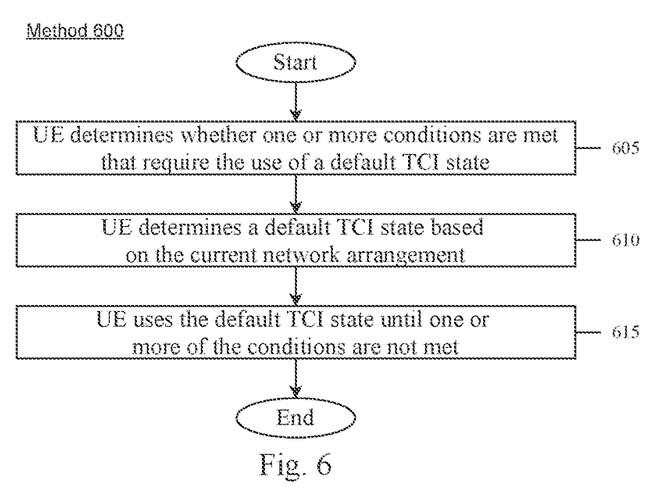
FIG. 6 shows a method for determining a default TCI state for PDSCH scheduling according to various exemplary embodiments.

FIG. 6 shows a method 600 for determining a default TCI state for PDSCH scheduling. In 605, the UE determines whether one or more conditions are met that require the use of a default TCI state. For example, the conditions may include the "transmission configuration indication" not being configured in the DCI that schedules the PDSCH, or the time offset between the reception of the DCI and the corresponding PDSCH of a serving cell being less than a threshold time duration.

In 610, if the conditions are met, the UE determines a default TCI state based on the current network arrangement. For example, the rules for determining the default TCI state may depend on whether the UE is deployed in a single-TRP PDSCH operation, a multi-DCI multi-TRP PDSCH operation, a single-DCI multi-TRP operation, a HST-SFN operation, or an AP-CSI-RS operation.

In 615, the UE uses the default TCI state until one or more of the conditions are not met. For example, a TCI state can be configured in a new DCI and used for the PDSCH once the BeamSwitchTiming threshold elapses, or the BeamSwitchTiming threshold may elapse and the previously configured TCI state can be used for PDSCH.

EXAMPLES

In a first example, a processor of a user equipment (UE) is configured to perform operations including receiving, from a serving base station, a configuration for a control resource set (CORESET) including two transmission configuration indicator (TCI) states for a frequency resource, wherein a first TCI state is associated with a beam transmitted from a first transmission and reception point (TRP) and a second TCI state is associated with a beam transmitted from a second TRP, determining, for the beams transmitted from each of the first and second TRPs, respective one or more reference signal (RS) resources to monitor for radio link monitoring (RLM) or beam failure detection (BFD) and monitoring the RS transmitted from the first TRP using the first TCI state and the RS transmitted from the second TRP using the second TCI state.

In a second example, the processor of the first example, wherein the operations further comprise receiving, from the serving base station, a configuration for candidate beam detection (CBD) resources to be monitored from each of the first and second TRPs.

In a third example, the processor of the second example, wherein the CBD resource configuration comprises a candidateBeamRSList for a special cell (SpCell) or a candidateBeamRSSCellList for a secondary cell (SCell), wherein the CBD resource configuration includes at least one set of CBD RS information elements (IE), the CBD RS IE comprising a PRACH-ResourceDedicatedBFR for the SpCell or a candidateBeamRS for the SCell.

In a fourth example, the processor of the third example, wherein a single set of CBD RS IE is configured, wherein each CBD RS IE in the set is logically mapped to one of the first or second TRPs.

In a fifth example, the processor of the third example, wherein each CBD RS IE in the set is configured with one or two CBD RS, wherein each CBD RS is logically mapped to one of the first or second TRPs.

In a sixth example, the processor of the third example, wherein two sets of CBD RS IE is configured, wherein a first set is logically mapped to the first TRP and a second set is logically mapped to the second TRP.

In a seventh example, the processor of the second example, wherein the operations further comprise determining whether a candidate beam is valid by determining a candidate beam quality value based on the CBD RS and comparing the determined candidate beam quality value to a threshold.

In an eighth example, the processor of the seventh example, wherein the candidate beam quality is determined independently for each of the beams transmitted from each of the first and second TRPs.

In a ninth example, the processor of the seventh example, wherein the candidate beam quality is determined jointly for the beams transmitted from each of the first and second TRPs.

In a tenth example, the processor of the seventh example, wherein the candidate beam quality is determined as a reference signal received power (RSRP).

In an eleventh example, the processor of the seventh example, wherein the candidate beam quality is determined as a physical downlink control channel (PDCCH) block error rate (BLER).

In a twelfth example, the processor of the seventh example, wherein, when the candidate beam is determined to be valid, the operations further comprise reporting the candidate beam to the network.

In a thirteenth example, the processor of the twelfth example, wherein, when the candidate beam includes two CBD RSs, selecting one of the CBD RSs to report or reporting the two CBD RSs as a pair.

In a fourteenth example, the processor of the twelfth example, wherein the operations further comprise monitoring the PDCCH using QCL parameters corresponding to QCL parameters used to report the candidate beam until a new beam configuration is received.

In a fifteenth example, the processor of the fourteenth example, wherein the QCL parameters used to report the candidate beam are selected to correspond to one or both CBD RSs included in the candidate beam.

In a sixteenth example, the processor of the twelfth example, wherein the operations further comprise transmitting on a physical uplink control channel (PUCCH) using QCL parameters and power control settings corresponding to QCL parameters used to report the candidate beam until a new beam configuration is received.

In a seventeenth example, the processor of the sixteenth example, wherein the QCL parameters used to report the candidate beam are selected to correspond to one of the CBD RSs included in the candidate beam.

In an eighteenth example, a processor of a user equipment (UE) is configured to perform operations comprising determining whether one or more conditions are met that require a default transmission configuration indicator (TCI) state to be used for physical downlink shared channel (PDSCH) buffering or decoding, when the conditions are met, determining parameters for the default TCI state based on a current network operation and using the default TCI state for PDSCH buffering or decoding until one or more of the conditions are not met.

In a nineteenth example, the processor of the eighteenth example, wherein the current network operation comprises a multiple transmission and reception point (TRP) multiple downlink control information (DCI) PDSCH transmission.

In a twentieth example, the processor of the nineteenth example, wherein the default TCI state parameters are determined based on a configured control resource set (CORESET), wherein the CORESET is configured with two TCI states and the UE selects one of the two TCI states to be used as the default TCI state.

In a twenty first example, the processor of the nineteenth example, wherein the default TCI state parameters are determined based on a configured control resource set (CORESET), wherein only CORESETs configured with a single TCI state are considered when determining the default TCI state.

In a twenty second example, the processor of the eighteenth example, wherein the current network operation comprises a multiple transmission and reception point (TRP) single downlink control information (DCI) PDSCH transmission.

In a twenty third example, the processor of the twenty second example, wherein the default TCI state parameters are determined based on a configured control resource set (CORESET), wherein only CORESETs configured with two TCI states are considered when determining the default TCI state.

In a twenty fourth example, the processor of the twenty second example, wherein the default TCI state parameters are determined based on a TCI codepoint activated for the PDSCH having a lowest ID amongst all TCI codepoints activated for the PDSCH.

In a twenty fifth example, the processor of the twenty second example, wherein the default TCI state parameters are determined based on a TCI codepoint activated for the PDSCH having a lowest ID amongst all TCI codepoints activated for the PDSCH that have two TCI states.

In a twenty sixth example, the processor of the eighteenth example, wherein the current network operation comprises a high speed train (HST) single frequency network (SFN) PDSCH transmission.

In a twenty seventh example, the processor of the twenty sixth example, wherein the default TCI state parameters are determined based on a configured control resource set (CORESET) with a lowest ControlResourceSetId in a latest slot for which the UE performs PDCCH monitoring.

In a twenty eighth example, the processor of the twenty sixth example, wherein the default TCI state parameters are determined based on a configured control resource set (CORESET), wherein only CORESETs configured with two TCI states are considered when determining the default TCI state.

In a twenty ninth example, the processor of the twenty sixth example, wherein the default TCI state parameters are determined based on a TCI codepoint activated for the PDSCH having a lowest ID amongst all TCI codepoints activated for the PDSCH.

In a thirtieth example, the processor of the twenty sixth example, wherein the default TCI state parameters are determined based on a TCI codepoint activated for the PDSCH having a lowest ID amongst all TCI codepoints activated for the PDSCH that have two TCI states.

In a thirty first example, the processor of the twenty sixth example, wherein, when a number of TCI states indicated in downlink control information (DCI) is different from a number of TCI states from the default TCI states, the UE determines the default TCI state as a TCI state indicated in the DCI if the TCI is included in the default TCI states.

In a thirty second example, the processor of the eighteenth example, wherein the current network operation comprises an aperiodic channel state information reference signal (AP-CSI-RS).

In a thirty third example, the processor of the thirty second example, wherein the default TCI state parameters are determined based on a configured control resource set (CORESET), wherein the CORESET is configured with two TCI states and the UE selects one of the two TCI states to be used as the default TCI state.

In a thirty fourth example, the processor of the thirty second example, wherein the default TCI state parameters are determined based on a configured control resource set (CORESET), wherein only CORESETs configured with a single TCI state are considered when determining the default TCI state.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:
1. A processor of a user equipment (UE) configured to perform operations comprising:
   receiving, from a serving base station, a configuration for a control resource set (CORESET) including two transmission configuration indicator (TCI) states for a frequency resource, wherein a first TCI state is associated with a first beam transmitted from a first transmission and reception point (TRP) and a second TCI state is associated with a second beam transmitted from a second TRP;
   determining, for the first and second beams transmitted from each of the first and second TRPs, respective one or more reference signal (RS) resources to monitor for radio link monitoring (RLM) or beam failure detection (BFD); and
   monitoring the RS transmitted from the first TRP using the first TCI state and the RS transmitted from the second TRP using the second TCI state, wherein the respective one or more RS to be monitored from each of the first and second TRPs is determined based on an explicit configuration received from the serving base station and wherein the explicit configuration includes two sets of RadioLinkMonitoringRS, wherein a first set is logically mapped to the first TRP and a second set is logically mapped to the second TRP.

2. The processor of claim 1, wherein each RadioLinkMonitoringRS in the set is configured with a single detectionResource indicating a RLM RS, wherein each RadioLinkMonitoringRS is logically mapped to one of the first or second TRPs.

3. The processor of claim 1, wherein each RadioLinkMonitoringRS in the set is configured with one or two detectionResources indicating a RLM RS, wherein each detectionResource is logically mapped to one of the first or second TRPs.

4. The processor of claim 1, wherein the respective one or more RS to be monitored from each of the first and second TRPs is determined based on RS used for physical downlink control channel (PDCCH) receptions.

5. The processor of claim 4, wherein the UE determines to monitor the RS used for PDCCH reception only in a CORESET configured with two TCI states.

6. The processor of claim 4, wherein the operations further comprise:
counting a number of RS used for failure detection to determine whether any RS is to be dropped as RLM RS.

7. The processor of claim 6, wherein RS from PDCCH configured with two TCI states are counted as two RS.

8. The processor of claim 6, wherein RS from PDCCH configured with two TCI states are counted as one RS.

9. The processor of claim 6, wherein, when it is determined that one or more RS are to be dropped as RLM RS, the RS are dropped based on priority rules between RS from PDCCH configured with two TCI states and RS from PDCCH configured with one TCI state.

10. The processor of claim 1, wherein the operations further comprise:
calculating a physical downlink control channel (PDCCH) block error rate (BLER) independently for each of the first and second beams transmitted from each of the first and second TRPs.

11. The processor of claim 1, wherein the operations further comprise:
calculating a physical downlink control channel (PDCCH) block error rate (BLER) jointly for the first and second beams transmitted from each of the first and second TRPs.

12. A user equipment (UE), comprising:
a transceiver configured to communicate with a base station; and
a processor communicatively coupled to the transceiver and configured to perform operations comprising:
receiving, from a serving base station, a configuration for a control resource set (CORESET) including two transmission configuration indicator (TCI) states for a frequency resource, wherein a first TCI state is associated with a first beam transmitted from a first transmission and reception point (TRP) and a second TCI state is associated with a second beam transmitted from a second TRP;
determining, for the first and second beams transmitted from each of the first and second TRPs, respective one or more reference signal (RS) resources to monitor for radio link monitoring (RLM) or beam failure detection (BFD); and
monitoring the RS transmitted from the first TRP using the first TCI state and the RS transmitted from the second TRP using the second TCI state, wherein the respective one or more RS to be monitored from each of the first and second TRPs is determined based on an explicit configuration received from the serving base station and wherein the explicit configuration includes two sets of RadioLinkMonitoringRS, wherein a first set is logically mapped to the first TRP and a second set is logically mapped to the second TRP.

13. The UE of claim 12, wherein each RadioLinkMonitoringRS in the set is configured with a single detectionResource indicating a RLM RS, wherein each RadioLinkMonitoringRS is logically mapped to one of the first or second TRPs.

14. The UE of claim 12, wherein each RadioLinkMonitoringRS in the set is configured with one or two detectionResources indicating a RLM RS, wherein each detectionResource is logically mapped to one of the first or second TRPs.

15. The UE of claim 12, wherein the respective one or more RS to be monitored from each of the first and second TRPs is determined based on RS used for physical downlink control channel (PDCCH) receptions.

16. The UE of claim 15, wherein the UE determines to monitor the RS used for PDCCH reception only in a CORESET configured with two TCI states.

17. The UE of claim 15, wherein the operations further comprise:
counting a number of RS used for failure detection to determine whether any RS should be dropped as RLM RS.

18. The UE of claim 17, wherein RS from PDCCH configured with two TCI states are counted as two RS.

* * * * *